Figure 1:
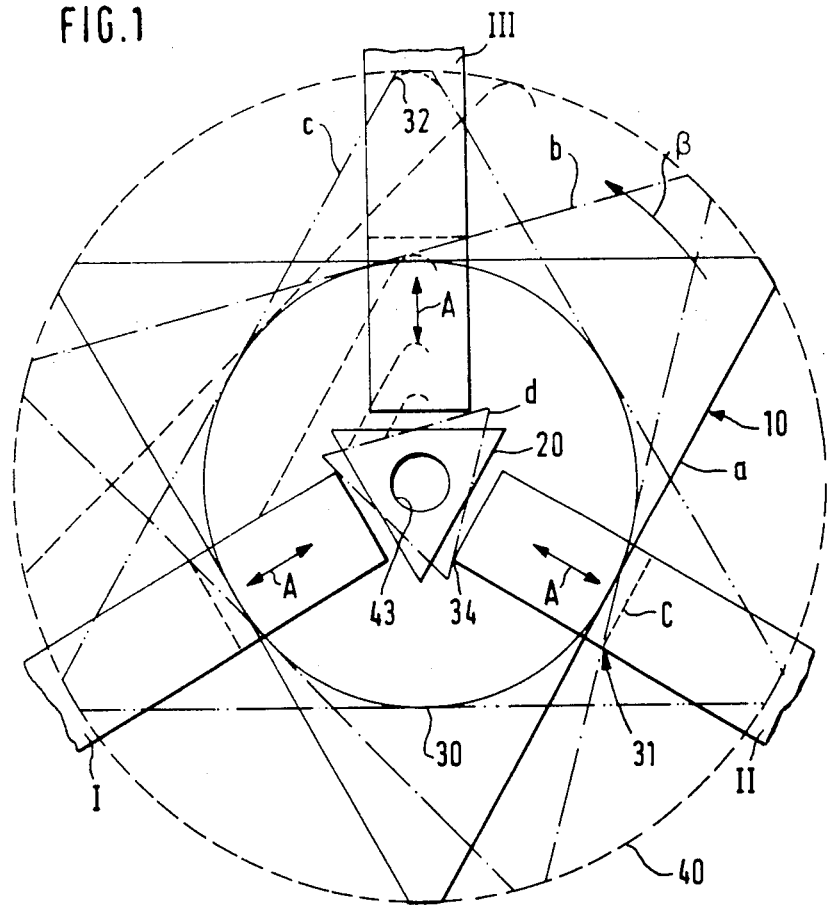

United States Patent [19]

Mathes

[11] Patent Number: 4,746,131
[45] Date of Patent: May 24, 1988

[54] APPARATUS FOR INTERNAL CHUCKING OF SOFT THREE-JAW CHUCKS ON LATHES

[76] Inventor: Adam Mathes, Vogelsangstr. 7, 7403 Ammerbuch 4, Fed. Rep. of Germany

[21] Appl. No.: 941,110

[22] Filed: Dec. 12, 1986

[30] Foreign Application Priority Data

Dec. 18, 1985 [DE] Fed. Rep. of Germany ....... 3544799
Apr. 29, 1986 [DE] Fed. Rep. of Germany ....... 3614501

[51] Int. Cl.⁴ ............................................ B23B 25/06
[52] U.S. Cl. ...................................... 279/1 SJ; 82/45; 279/1 L
[58] Field of Search ................ 33/178 R, 178 B, 626, 33/642, 644; 82/45; 279/1 R, 1 ME, 1 L, 1 SJ

[56] References Cited

U.S. PATENT DOCUMENTS

| | | | |
|---|---|---|---|
| 346,048 | 7/1886 | Humphrey | 82/45 X |
| 3,046,671 | 7/1962 | Moores | 82/45 X |
| 3,104,474 | 9/1963 | Rehart | 279/1 SJ |
| 3,276,136 | 10/1966 | Testa | 82/45 X |

FOREIGN PATENT DOCUMENTS 296114 5/1916 Fed. Rep. of Germany .......... 82/45

Primary Examiner—Gil Weidenfeld
Assistant Examiner—Steven C. Bishop
Attorney, Agent, or Firm—McAulay, Fields, Fisher, Goldstein & Nissen

[57] ABSTRACT

An apparatus for the internal chucking of a soft three-jaw chuck on lathes is provided to enable the three jaws to be positioned so that they can be bored out to a high precise chucking dimension. The apparatus includes two rotatable triangular clamping plates that are disposed in any preselected rotational position relative to each other. The plates each have an external configuration of an equilateral triangle and are adapted to be received in the soft three-jaw chuck in a desired angular position such that common positions of contact result from the jaws of the three-jaw chuck from the edges of the two clamping plates which are canted one relative to the other. The desired chucking dimension range is covered by the relative dimensions of the two clamping plates.

15 Claims, 4 Drawing Sheets

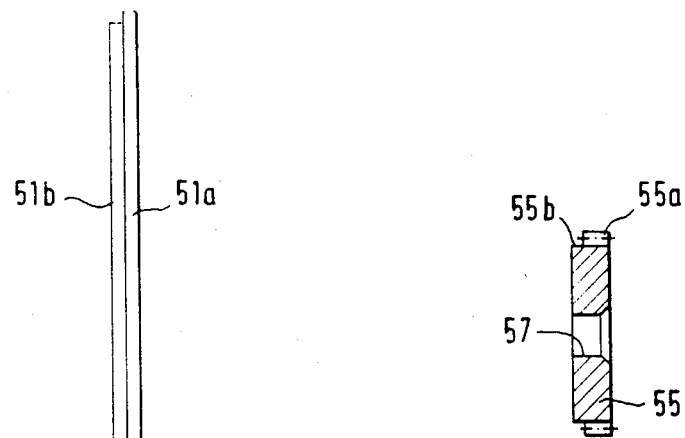
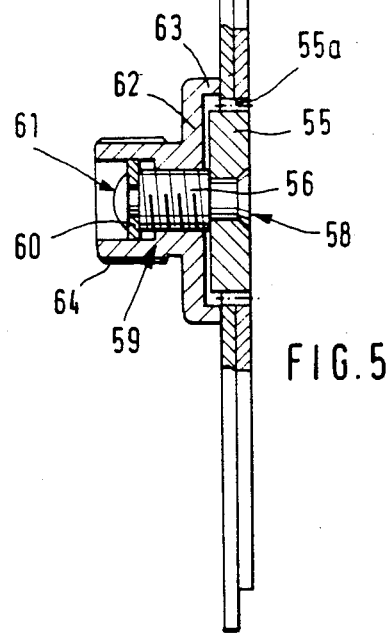

APPARATUS FOR INTERNAL CHUCKING OF SOFT THREE-JAW CHUCKS ON LATHES

PRIOR ART

The present invention relates to an apparatus of the type set forth in the heading portion of the main claim. An apparatus of this type is generally known and comprises a round plate which is grasped by the soft jaws of a three-jaw chuck during internal chucking, causing the jaws to be in a firmly contacting relationship, under compressive force, with the inserted round plate, which has a stipulated outside diameter. It is then possible to bore the jaws out to a highly precise ultimate clamping dimension that is required for further processing steps. Under the procedure that is customarily employed when lathe workpieces are being machined, especially if corresponding demands are placed upon their accuracy, the workpiece, in the form of a blank, is first chucked in the hard jaws of a three-jaw chuck with a given length of the workpiece then being initially turned to the desired dimension, i.e. to a stipulated diameter. When reversing the workpiece in order to be able to also machine the second side, which had previously been chucked, it is necessary for this second side to be chucked in soft jaws; however this necessitates precise preliminary machining of these soft jaws in order to ensure that the first part of the workpiece to be turned, i.e. the side which was machined first, will fit precisely into the mount formed by the soft jaws. To accomplish this, it is necessary for these soft jaws to be bored out for internal chucking, i.e. internally turned to the dimension of the first side of the workpiece to be machined, as the two sides of the lathe workpiece, which were produced by different machining steps, could otherwise be out of concentricity one relative to the other.

However it is naturally necessary for the soft jaws to be bored out while the jaws are in the chucked condition, as it is obvious that precise machining would otherwise not be possible. If a simple round plate is employed to keep the jaws tensioned for this purpose, it might then be necessary to have to select a plate having a different clamping diameter for the next workpiece to be machined, whose diameter might, for example, differ by 1 mm or less from the first, it might possibly further be necessary to remove large amounts of stock from the three-jaw chuck to be machined, and the problem will arise that the machining process will involve considerable dead time, as the matching components must be found from a plurality of available jaws and corresponding plates. This is cumbersome and is not conducive to smooth and precise machining operations.

It is therefore the object of the present invention to create an apparatus for internal chucking of soft jaws on lathes, of which only one, preferably comprising a set of differing sizes, need be present at each lathe and which then permits any desired inside dimensions to be provided, with any desired degree of incrementation, for boring out the three-jaw chuck, with each of such apparatuses completely and continuously covering a given inside diameter, without any increments.

In this connection, it is already known practice to employ a ring for outside turning of a three-jaw chuck in order to machine tubular blanks, for example, with the ring being employed under compressive force for fabrication of the three-jaw chuck and with the ring having adjustable pins, i.e. pins that can be set for varying depths. As already recited above, however, an apparatus of this type can be employed only for turning the outside diameter; aside from simple clamping plates, which always have only one given diameter, there are no suitable aids available for internally chucking a three-jaw chuck of this type.

ADVANTAGES OF THE INVENTION

The present invention solves this object by means of the characterizing features of the main claim and offers the advantage that, by configuring the clamping plate system on the basis of an equilateral triangle, which clamping plate system covers a given clamping range, the soft three-jaw chuck can be internally chucked to any desired intermediate dimension within this range, so that highly precise boring is then subsequently possible and, after the apparatus has been removed, the finished cylindrical surface of the half-machined workpiece can be placed in the chucking opening of the soft three-jaw chuck, which has been bored out in this manner, and the other side of the workpiece can then be machined.

As a result of the mechanical circumstances that exist in a three-jaw chuck of a lathe and as a result of a certain degree of external roughness on the outer three legs of the triangular clamping plate, any desired clamping position, i.e. any desired diameter of the soft three-jaw chuck, can be set under tension through simple rotation of the clamping plate system that is being employed in each case and the subsequent internal traversing of the three jaws, so that only a minimum of stock need be removed in order to permit the workpiece to be bored out extremely precisely to the ultimate chucking dimension for the workpiece to be further machined.

The virtually unlimited reuse capability that is offered by a triangular clamping plate system of this type is especially advantageous, as the clamping plate(s), itself/themselves, is/are not subjected to any deformation or damage as a result of the internal traversing and engagement of the jaws of the soft three-jaw chuck and merely keep(s) the jaws of the chuck under tension so that they can be bored out in a given, replicable position—which is then reproduced when the next workpiece is subsequently chucked—to the highly precise inside dimension that is required for being able to chuck the workpiece in a precisely concentric manner under the given conditions.

Further embodiments and enhancements of the present invention are the subject of the subclaims, in which they are set forth. Especially advantageous is the possibility, in a first practical example of the present invention, of being able to provide the external leg surfaces of the triangular clamping plate with a certain degree of roughness and harden them, preferably by means of inductive hardening, so that the jaws are in a contacting relationship in the respective position in an arrestable, or at least completely slip-free, manner, and the hardening prevents the jaws from working into the respective chucked position.

It is further advantageous that a limited number of these triangular clamping plates, namely only six triangular clamping plates, for example, need be employed to cover a diameter range of between 20 mm and 400 mm, with the diameter range still overlapping in the individual positions.

A further advantage is that, by means of a central engagement mechanism, the clamping plate(s) can be inserted in the mounting area of the three-jaw chuck in any desired angular position with the aid of a suitable, preferably rotationally lockable, auxiliary tool, thereby affording additional work safety as, which might be the case when so-called hydraulic or pneumatic chucks are being employed, the respective triangular clamping plate is not being held in the hand if a chuck of this type should inadvertently close by itself. This auxiliary tool has a longitudinal shank with a handle, as well as a forward engagement member which is inserted into the central opening of the triangular clamping plate.

In a further preferred practical example of the present invention, in which two clamping plates are employed, one clamping plate is modified in such a manner as to produce precisely defined, adjustable contact areas for the jaws of the three-jaw chuck, with the diameters of the adjustable contact areas being able to be altered in a continuous manner; these defined contact areas can also be termed intermediate engagement positions and result from the fact that, while retaining the basic concept of triangular clamping plate rotation in the internal area of the jaws of the three-jaw chuck, a relative rotation between two rotatable triangular clamping plates which are employed in this case additionally results, with any degree of finely incremented angular positions.

In this practical example of the present invention, a second triangular clamping plate, again on the basis of an equilateral triangle, is therefore associated to the first triangular clamping plate, with the second triangular clamping plate being able to assume a fixable or arrestable rotational position relative to any position of the first triangular clamping plate. After the respectively desired rotational position has been set, which simultaneously also produces the respective diameter within given diameter ranges with given size dimensions of a clamping plate system of this type, the two triangular clamping plates, whose angular position one relative to the other has been arrested, are placed in the soft jaws of the three-jaw chuck and now secure the given chuck seating position for these jaws for any desired diameter.

The rotatability, with subsequent fixation, of the two clamping plates one relative to the other can be achieved in that a first clamping plate forms external spur toothing centrally, for example by means of its projecting axle stub, on which toothing the internally toothed hole of the second triangular clamping plate can then be placed and arrested in any desired angular position, preferably by tightening a suitable setscrew.

DRAWINGS

Figure 2:
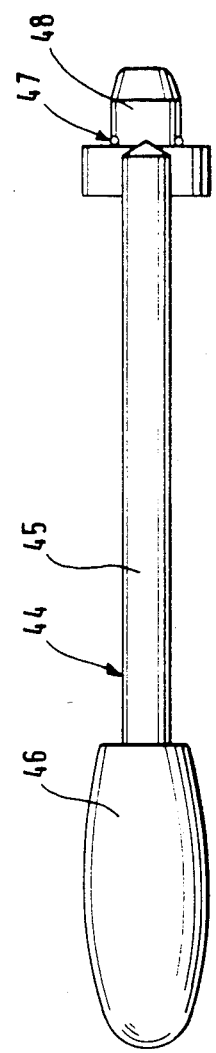
Figure 3:
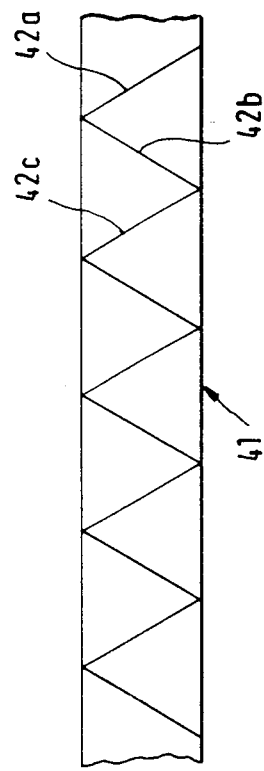
Figure 4:
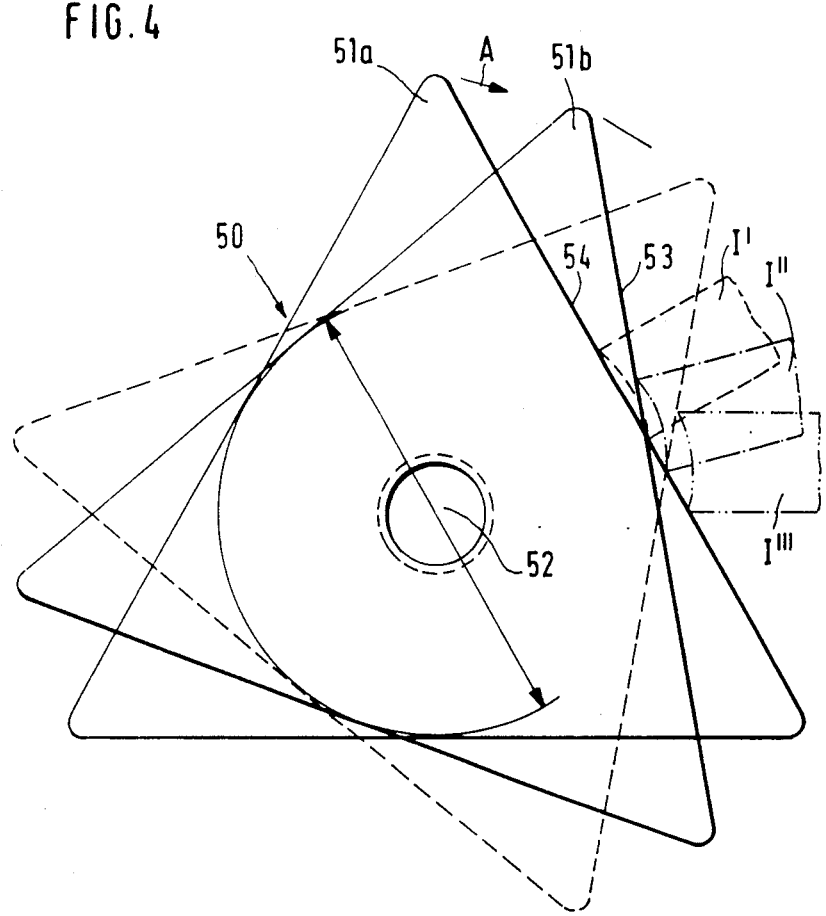

The above discussed and other objects, features and advantages of the present invention will become more apparent from the following description thereof, when taken in connection with the practical examples shown in the accompanying drawings, in which FIG. 1 shows a highly schematicized representation of basic forms of various sizes of triangular clamping plates, in various angles, with the position of the clamping plates of a soft three-jaw internal chuck also being suggested;

FIG. 2 shows a side view of an auxiliary tool for inserting a triangular clamping plate in the soft three-jaw chuck; and FIG. 3 shows a schematic representation of a possibility for cost-efficient fabrication of clamping plates of this type, in the form of equilateral triangles from a strip of sheet metal;

FIG. 4 shows a schematic top view of a further embodiment of the present invention in which two triangular clamping plates, which are rotatable one relative to the other, are disposed; whereby FIG. 5 shows a section through the two clamping plates which are rotatable one relative to the other, taken along the central mid line; and FIG. 6 shows a section through a gear element which is attached to a first triangular clamping plate in a stationary manner and which secures the rotational position of a second clamping plate relative to the first clamping plate by meshing alternately with the internally toothed gear of the second clamping plate.

DESCRIPTION OF PRACTICAL EXAMPLES

Referring now to the drawings, where like reference numerals designate like parts throughout the several views, it will be seen that the underlying concept of the present invention is to dispose a templet or clamping means for achieving a clamping position of the jaws of a soft three-jaw chuck on a lathe in any desired transition, whereby the templet or clamping means covers a given diameter range in small increments or within which the jaws of the three-jaw chuck can be clamped in any desired position.

A first practical example of the present invention will now be described below on the basis of the representation that is shown in FIG. 1. In FIG. 1, the jaws of what is, in this case, a soft three-jaw chuck for internal chucking on a lathe are denoted I, II and III and two different sizes of suitable triangular clamping plates in various angle positions are represented concentrically to these jaws. Jaws I, II and III of the soft three-jaw chuck can be traversed inwardly and outwardly, as shown by arrow A; this can be effected by means of manual rotation through application of a chucking tool on the three-jaw chuck, or through hydraulic or pneumatic effect.

The drawing in FIG. 1 further contains two triangular clamping plates having different dimensions, represented in conjunction with this three-jaw chuck, i.e. a first size of clamping plate 10 and an inner, smaller clamping plate 20. The mechanism upon which the present invention is based will be described on the basis of larger clamping plate 10, which can cover a chucking diameter range of between 85 mm and 160 mm in a transitionless manner, for example. With respect to the orientation of jaws I, II and III of the soft three-jaw chuck, the position of clamping plate 10 at (a), which is illustrated in FIG. 1, is the position that produces the smallest available chucking diameter, as it can be seen that, with triangular clamping plate 10 inserted, jaws I, II and III can traverse inwardly to an inner position that is denoted by the solid line of inner circle 30 in this angular position, or orientation, of the triangular configuration of triangular clamping plate 10. In this case, i.e. in this angular rotational position of triangular clamping plate 10 within the three-jaw chuck having soft jaws I, II and III, the jaws are in a contacting relationship with the centers of the legs of triangular clamping plate 10, where they can assume a desired clamping position in which they can be chucked under tension for the purpose of being bored out to the desired ultimate mounting dimensions for a subsequent turning process on the lathe. Depending upon the angular shift of the triangle, as suggested in the counterclockwise direction along arrow B in FIG. 1, for example, it will be found that further positions result, i.e. an intermediate position (b) and an ultimate position (c) of larger triangular clamping plate 10, whereby jaws I, II and III can be traversed inwardly to the position C in the jaws that is suggested by the dashed lines when the triangle is located in intermediate position (b), which, of course, was selected completely at random and could be located anywhere between ultimate positions (a) and (c); in position C, the left-hand corner of each jaw—as viewed from the outside—is in a contacting relationship at a point of each triangular clamping leg that is suggested at 31.

Should triangular clamping plate 10 be rotated further in the counterclockwise direction, whereby, of course, the same results would also be obtained were it to be rotated in the clockwise direction, the position finally results in which jaws I, II and III would be retracted all the way to outer circle 40 and would be in a contacting relationship with the pointed outer corners of the triangular clamping plate. For this purpose, they are illustrated either—as shown in FIG. 1—with a flattened tip, or they can also be configured with rounded tips having a radius, which is preferred and which is suggested at 32 in FIG. 1.

Corresponding angular rotational positions of smaller triangular clamping plate 20 also result in a similar manner for a smaller diameter range, with the dash-dotted position (d) of triangle 20 representing the intermediate position at which clamping jaws I, II and III are in an effective contacting relationship. Thus, the adjustment range for a triangular clamping plate of this type is always determined on the basis of the difference between the diameters of inner circle 30, shown here for triangular clamping plate 10, which has the larger dimensions, and outer circle 40; all in all, if a diameter range of from 27 mm to 350 mm is to be covered, for example, a given clamping plate spread, or size distribution, results which need not be stipulated in detail and customarily consists of a set of different sizes of clamping plates or systems. The preferably overlapping dimensions of the individual plates that form each set can then, within limits, be freely selected and determined.

Reference should also be made to the fact that, in contrast to what might initially be expected, the triangular clamping plates in jaws I, II and III do not slip when in the intermediate positions, i.e. rotate out of an initial position as a result of the compressive force until the three jaws of the three-jaw chuck have assumed the smallest possible position along the inner circle; on the contrary, each triangular clamping plate retains each intermediate position, even if extremely smooth external surfaces are involved, as a result of the mechanics that are produced in the case of a three-jaw chuck of this type; this can be illustrated by imagining that jaw II, whose left edge acts upon triangular clamping plate 20 at 34 in position d, attempts to force this clamping plate in the general direction of the two other clamping plates, which, of course, do not yield but also force the triangle in the direction of the oblique, opposite jaws. Since the jaws cannot yield laterally, as they are being guided, fixed chucking positions result in every angular position of the triangular clamping plates, which ensures the universal application of the apparatus according to the present invention.

A first possibility for fabricating triangular clamping plates of this type could be effected, as illustrated in FIG. 3, in that successive cuts 42a, 42b, 42c, etc. are made with shears in a given strip of sheet metal 41, with each cut producing an appropriate, equilateral triangle if the strip has been rotated 180° prior to each cut. It is then practical to stamp a central mounting hole 43 in a suitable manner for receiving the auxiliary tool 44 shown in FIG. 2. Auxiliary tool 44 can comprise a shank 45, a handle 46 and a forward engagement member 47 for grasping the respective triangular clamping plate with a central guide member 48 and placing it in a stipulated angular position in the mounting opening that is formed by jaws I, II and III in such a manner that it is secured against rotating.

Following the machining process for fabrication of the central hole, it is then possible to machine the corners, i.e. to round them by means of milling or similar processes, if so desired. The legs of the respective triangular clamping plates can then be provided with a certain degree of external roughness, comprising fluting, knurling or roughening through other means. This can prove to be advantageous for better anchoring or gripping of the jaws. The triangular legs of the respective clamping plate are then hardened, preferably by means of the inductive hardening process, and tempered.

A further preferred practical example of the present invention is illustrated in FIGS. 4, 5 and 6 and will now be described in more detail below. In the case of this practical example, which is also based upon the underlying concept of the rotation of a triangular clamping plate relative to the jaws of the three-jaw chuck, two triangular clamping plates 51a and 51b, which can be rotated and then fixed again one relative to the other, thus forming a clamping plate system 50, are disposed if especially unmistakable and dependable positioning and contact of the jaws are desired; clamping plates 51a and 51b preferably have identical outside dimensions and are arranged in such a manner that they can be rotated about their common centers one relative to the other, however are also interconnected one with the other.

This immediately permits the more far-reaching solution that is produced by this practical example, which is shown by the illustration in FIG. 4, to be recognized, without having to recite in more detail the respective possibilities of connection and/or arresting that exist between triangular clamping plates 51a, 51b.

If, in a mental exercise, it is assumed that both triangular clamping plates 51a, 51b are first located one above the other in a flush and covering manner, it will be recognized that, as in the first practical example of the present invention, there will always be a minimum inner and a maximum outer clamping diameter for the jaws of the three-jaw chuck of a lathe, on the one hand through the central contacting relationship against the lateral surfaces and, on the other, at the respective tips of the triangle. If, for example, a second triangular clamping plate 51b is now rotated relative to first triangular clamping plate 51a about their common center 52 in the direction of arrow A, for example, a first new, basically random rotational position results as the angular position of clamping plates 51a, 51b one relative to the other, which is illustrated by the solid line that represents the outline of clamping plate 51b. It can be seen that, in this new angular position, each of the legs of the triangle comes to rest in a position that is oblique relative to the original position and relative to the position that is retained by first clamping plate 51a i.e. that side edge 53 pushes up relative to the retained position of corresponding side edge 54 of first clamping plate 51a, thereby causing a jaw, which is shown only once, of the three-jaw chuck to be forced up out of basic position I' to the respectively greater diameters at any other positions I'' and I''' as the angular rotation increases. Any desired angular position between clamping plates 51a and 51b one relative to the other therefore represents a different inside diameter which has been assumed by jaws I, II and III, with the further advantage being produced that the positioning of the jaws in their points of contact on clamping plates 51a, 51b is fixed and secure in every relative angular position, as there are always three jaws I, II and III available, each of which assumes its position in such a manner that it is in a uniformly contacting relationship with each of clamping plates 51a, 51b on both sides, at the same distance from the imaginary point of intersection of the side edges, which shifts as a function of the angular rotation.

It can also be seen that, as the angular rotation increases, the diameter that is assumed by the jaws increases until it reaches the diameter of the outer circle of the equilateral triangles, whereby it is also (of course) possible to traverse from a larger diameter to the smallest diameter, i.e. in the opposite direction. However in this case, it would be necessary to assume an opening position of the respective triangle tips and a corresponding relative rotational angle, in which the three-jaw chuck fits between the opened tips in each corner area of the triangular clamping plates, with the inside diameter becoming increasingly smaller as the opening angle gradually increases.

In the representation shown in FIG. 4, the respective relative positions I', I" and I''' of the only jaw of the three-jaw chuck that is shown are represented by dashed, dash-dotted and dash-double dotted lines, with the second position of clamping plate 51b relative to clamping plate 51a also being shown by means of a dashed line.

Actually, the rotatability and fixability of clamping plates 51a, 51b one relative to the other can be implemented in a thoroughly free manner, for example by arranging them on a common axle and clamping them in the respective angular positions by means of non-positive tightening of a setscrew, for example; however a positive arresting possibility is preferred, whereby the preferred practical example that is shown in FIGS. 5 and 6 again consists of a gear element 55 which is connected with a first triangular clamping plate, for example 51a, in a stationary manner and which forms a central hub area having external spur toothing 55a, on which second triangular clamping plate 51b, having corresponding, meshing internal toothing, is then placed. The toothing mesh can be disengaged by drawing triangular clamping plate 51b forward axially, i.e. away from first triangular clamping plate 51a, and, after rotating it into a desired relative angular position, the mesh between the two sets of toothing can then be re-established by pressing second triangular clamping plate 51b against first triangular clamping plate 51a. In this manner, stipulated angular positions are produced, with the resolution, i.e. the fineness, of the angular shifting motion of the two clamping plates one relative to the other being a question of the number of teeth which form the external and internal threading; thus, the finer the teeth, the finer the increments of the respective, successive relative angular positions.

In practical fabrication of the apparatus according to the present invention, gear element 55 can be fabricated separately and can have a configuration of the type that is shown in FIG. 6, i.e. a shoulder 55b is additionally formed as axial definition of external toothing 55a; shoulder 55b ensures that, when second triangular clamping plate 51b, which is seated on gear element 55, is drawn off, second clamping plate 51b can not slip completely in the radial direction, but remains aligned, along with its internal toothing, on external toothing 55a, so that only the rotational motion need be performed and the desired rotational angle is then secured by pushing second clamping plate 51b axially onto the toothing.

In order to ensure that clamping plates 51a, 51b remain in this positive position one relative to the other that is secured by the toothing, a short axle pin 56 is provided, which is disposed in a hole 57 in gear element 55 and in a corresponding hole in first clamping plate 51a and fixed therein, e.g. by welding, as suggested at 58.

An arresting nut 59 having a special configuration is screwed onto a male thread of this axle pin 56, with arresting nut 59 being secured against complete removal, i.e. against being unscrewed competely from axle pin 56, by means of a retaining ring 60 which is connected with axle pin 56. This connection can be produced by rivetting the head of axle pin 56, as suggested at 61.

The configuration of arresting or fixing nut 59 is such that it widens in a cup-like manner in the direction of clamping plate 51b which is to be fixed in its respective mesh, i.e. there is a transition into an outwardly widening annular zone 62, which, in turn, forms a transition into an angled thrust collar web 63, which then secures clamping plate 51b in its respective position relative to clamping plate 51a. Arresting nut 59 can have knurling at 64, thereby permitting it to be easily loosened and tightened by hand. The respective relative spacings in the area of arresting nut 59, i.e. the possibility of being able to unscrew arresting nut 59 until it has reached a contacting relationship with retaining ring 60, for example, are selected in such a manner that, when axially withdrawing clamping plate 51b from the toothing, the clamping plate is freed of it, however cannot slip from ring shoulder 55b of gear element 55, on which it is then supported.

Should gear element 55 be fabricated separately, attachment to first clamping plate 51a can also be effected in such a manner that internal toothing is also disposed therein, in which external toothing 55a of gear element 55 then meshes half way, with the connection in the appropriate locations being effected by means of spot welding, crimping, etc. The other half of external toothing 55a of gear element 55, which remains exposed, is then employed for mounting the internal toothing of second clamping plate 51b.

It is obvious that, as already recited above, any other desired arresting mechanisms are possible here for the angular rotation of the two plates one relative to the other; for example, one of the clamping plates can have cylindrical or spiral-shaped holes, in which pins protruding from the other clamping plate engage in any desired relative angular position, thus also producing positive fixation of the two clamping plates one relative to the other. It is also possible to dispose annular toothing, one facing the other, on the two clamping plates, etc.

In this embodiment, as well, a suitable auxiliary tool in the form of a key, etc., which assumes a detachable position of engagement with interconnected clamping plates 51a, 51b, can also be provided for inserting the clamping plate system comprising the two clamping plates. In a simplest embodiment, the front end of this auxiliary tool has a thread with which it is screwed into a central thread in hub area 52 of the clamping plate system; however it is also possible to provide keyhole-shaped guides, so that projections on the auxiliary tool engage openings or mounting holes in the clamping plate system, thus securing it against rotation.

The present invention has been described above on the basis of preferred practical examples thereof. Obviously, many modifications and variations of the present invention are possible in the light of the above teachings. It should therefore be understood that, within the scope of the appended claims, the present invention may be practiced otherwise than as specifically described. In particular, individual characteristics of the invention can be employed individually or in combination one with the other.

What is claimed is:

1. An apparatus for internal chucking of a soft three-jaw chuck on lathes to enable the three jaws to subsequently be bored out to a highly precise ultimate chucking dimension, wherein two rotating triangular clamping plates are disposed in any desired rotational position one relative to the other, in which, with said two clamping plates being located in any desired position one relative to the other, common positions of contact result from said jaws of said three-jaw chuck from the edges of said two clamping plates that are then canted one relative to the other; said clamping plates having the external configuration of an equilateral triangle; said clamping plated being insertable in said soft three-jaw chuck whereby a predetermined chucking dimension range is covered thereby.

2. The apparatus according to claim 1, wherein said leg edges of said triangular clamping plates have a stipulated roughness.

3. The apparatus according to claim 2, wherein said roughness is formed by fluting or knurling or by means of any other machining process that is capable of producing said roughness.

4. The apparatus according to claim 1, wherein in the corners of said triangles are rounded.

5. The apparatus according to claim 1, wherein said legs of said triangle against which said jaws are in a contacting relationship in any desired position are roughened and hardened.

6. The apparatus according to claim 1, wherein said triangular configuration of said respective clamping plates is formed by being cut or stamped out of a strip of sheet metal.

7. The apparatus according to claim 1, wherein a central hole with means for securing each of said plates against rotation is disposed for receiving an auxiliary tool in such a manner that it is secured against rotation.

8. The apparatus according to claim 1, wherein said legs of said clamping plates are designed with smooth surfaces.

9. The apparatus according to claim 1, wherein said triangular clamping plates are hardened in their entiret or only at the edges of said legs.

10. The apparatus according to claim 1, wherein said two triangular clamping plates have identical outside dimensions and can be arrested in a positive manner in each of their freely selectable angular positions.

11. The apparatus according to claim 1, wherein said two triangular clamping plates are interconnected one with the other by means of a central axle pin.

12. The apparatus according to claim 1, wherein a gear element is disposed in the area of said axle pin which interconnects said two clamping plates one with the other, said gear element being associated to one of said triangular clamping plates in a stationary manner and to the other of said triangular clamping plates in a detachable manner.

13. The apparatus according to claim 1, wherein said gear element has an annular shoulder which forms a support for permitting said second clamping plate to rotate in an aligned manner when said second clamping plate is withdrawn from its external toothing.

14. The apparatus according to claim 1, wherein said gear element is inserted in internal toothing of said first clamping plate for stationary connection therewith and is fixedly connected therewith by means of welding, and wherein an arresting nut is disposed on the remaining gear rim of said gear element to secure said second clamping plate with its internal gearing.

15. The apparatus according to claim 14, wherein said arresting nut is rotatably arranged on an external thread of said axle pin, however is axially secured and secures said second clamping plate in its position of engagement relative to said first clamping plate through the relative mesh by means of an annular flange which extends over said gear element.

* * * * *